June 11, 1963 F. E. SMITH 3,093,050
DRAWING REPRODUCTION METHOD
Filed March 11, 1959 2 Sheets-Sheet 1
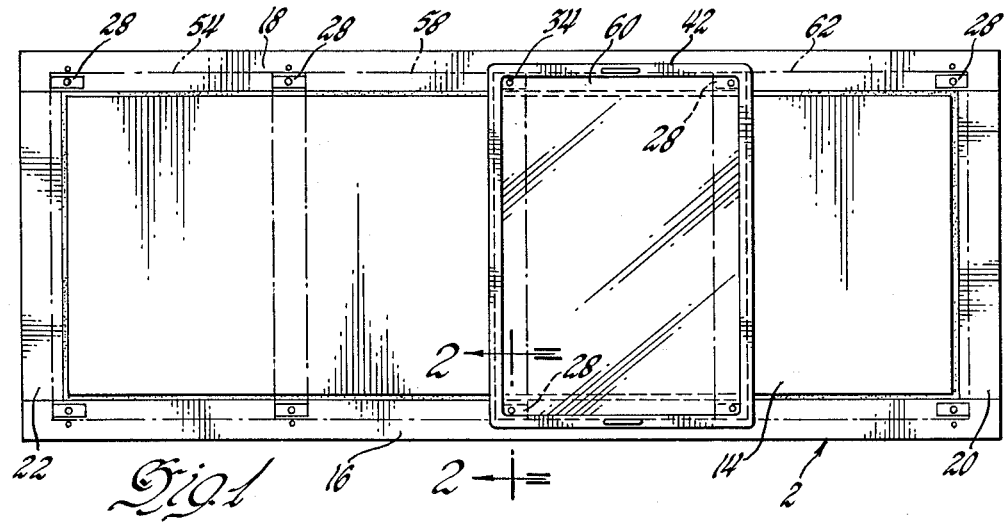
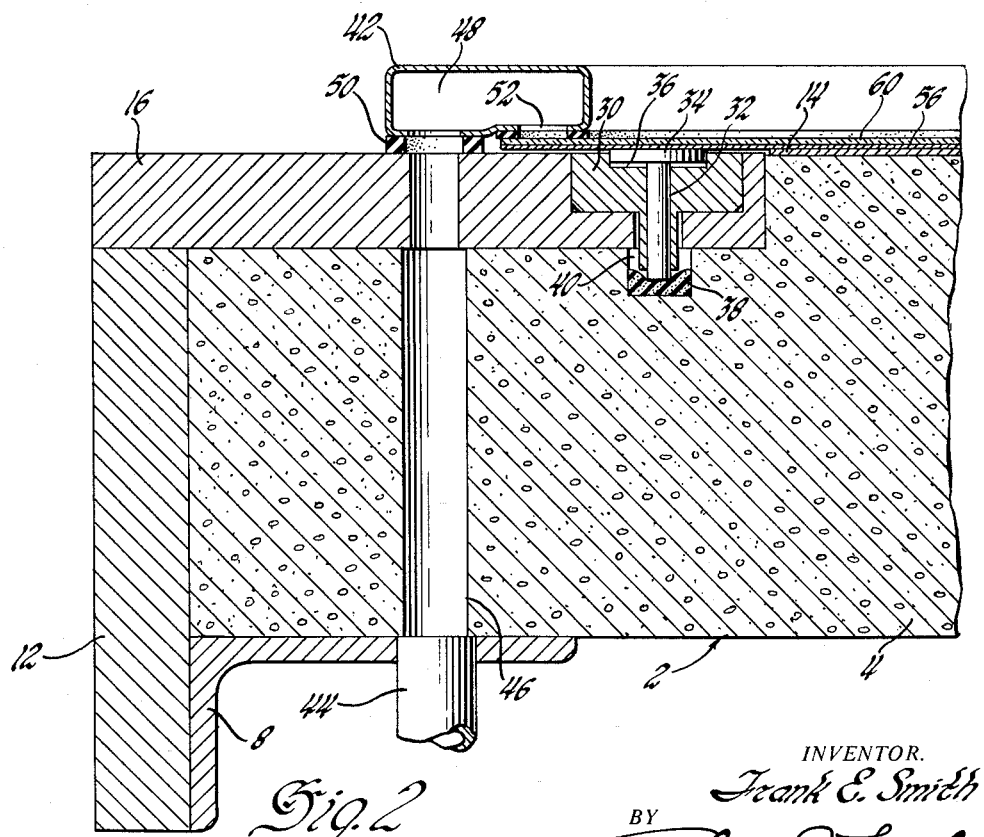
INVENTOR.
Frank E. Smith
BY Robert E. Fowler
ATTORNEY

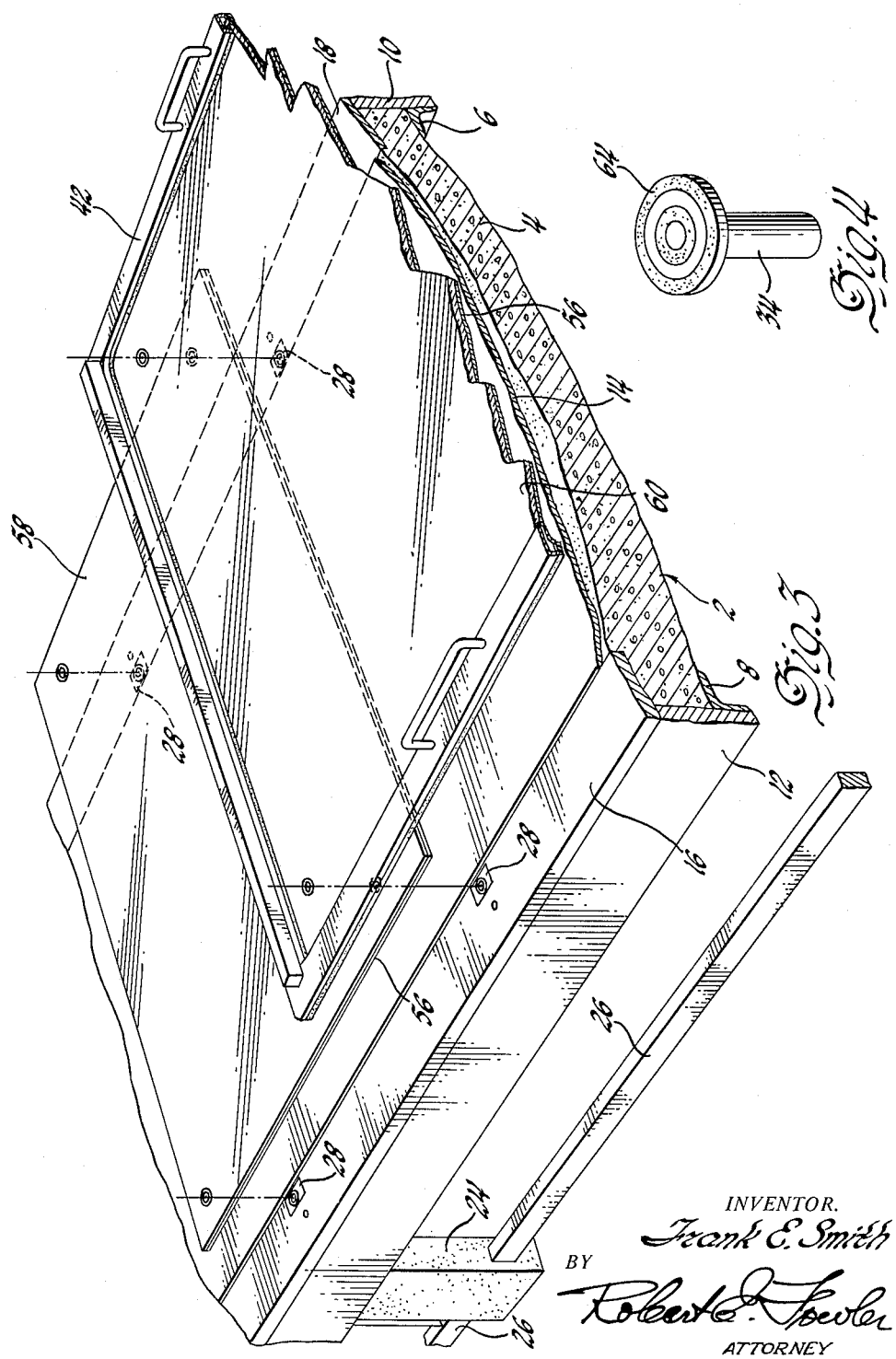

3,093,050
Patented June 11, 1963

3,093,050
DRAWING REPRODUCTION METHOD
Frank E. Smith, Birmingham, Mich., assignor to General Motors Corporation, Detroit, Mich., a corporation of Delaware
Filed Mar. 11, 1959, Ser. No. 798,702
2 Claims. (Cl. 95—73)

This invention relates to a method of and means for reproducing large metal drawings for industrial purposes. In both the aircraft and automotive industries it is common practice to make drawings of automobile bodies or aircraft parts full size on large metal sheets which drawings are used for scaling, gaging and for dies and templates. Obviously some of these drawings are quite large and because they must maintain extreme accuracy they must be made on materials which are dimensionally stable with changes in temperature and humidity. In making the original drawings large sheets of metal such for example as aluminum some five or six feet wide and perhaps eighteen feet long are painted with white paint on one side which provides a good drawing surface and the drawing actually drawn on this surface. The metal sheet is sufficiently dimensionally stable for any ordinary changes in temperature and humidity.

After the original drawing on metal has been completed it is frequently necessary to obtain a positive print or reproduction therefrom and the present invention is concerned with a method and means for obtaining such a reproduction.

In obtaining positive reproductions of the original metal drawing it is necessary to maintain dimensional stability both in the negative and in the positives obtained therefrom. It would be most straightforward to reproduce a positive from the original drawing by supporting the original drawing on a table, sensitizing a large sheet of glass slightly larger than the original drawing and placing it face down with the light sensitive surface in contact with the actual drawing and then reflex exposing the negative by suspending a source of light above the glass negative and projecting the light down through the glass negative and the light sensitive material and reflecting it from the light and dark areas to expose the light sensitive material. In this manner since the light sensitive material is in direct face contact with the lines of the drawing an accurate reproduction can be made. However, the handling of glass sheets for negatives some twenty feet long would be a difficult problem. Smaller negatives to be used as sections could be more easily handled. However, if such is the case, means must be provided for aligning the various negative sections very accurately so that the lines of the final positive print are just as accurate as the original.

It is, therefore, an object in making this invention to provide a method and means for reproducing positive prints from a large metal drawing which are dimensionally stable.

It is a further object in making this invention to provide a method and means for reproducing positive dimensionally stable prints from large metal drawings using a plurality of sectional negatives.

It is a further object in making this invention to provide a method and means for accurately aligning sectional negatives for the reproduction of large metal drawing prints.

With the above and other objects in view which will become apparent as the specification proceeds, my invention will be best understood by reference to the following specification and claims and the illustrations in the accompanying drawings, in which:

FIGURE 1 is a top plan view of an exposing table utilizing my invention;

FIG. 2 is an enlarged sectional view taken on line 2—2 of FIGURE 1;

FIG. 3 is an enlarged, partial perspective view of the table shown in FIGURE 1, parts being broken away and shown in section; and, FIG. 4 is a perspective detail view of one of the aligning tappets used on the table.

Referring now more particularly to the drawings, there is shown therein a heavy stable stone table indicated generally at 2 which consists of a main stone slab 4 of limestone or other similar stable material which is supported on two side rails 6 and 8. These sides rails 6 and 8 are carried in turn on longitudinally extending side members 10 and 12 made of stainless steel or other suitable material. Similar end pieces (not shown) complete the rectangular support for the stone slab 4 which is the main support for any metal drawing such as 14 when in place. Stainless steel or Invar frame members 16 and 18 having a very low coefficient of expansion extend down both sides of the table to form an outline for that area in which the metal drawing is to be supported and two cross portions 20 and 22 of the same material at the ends complete the rectangular outline for the top of the table. The rectangle so formed is sufficiently large to enclose any drawing which it is desired to print or reproduce and such drawing may be laid directly on the stone when it is completed and ready for reproduction. The stone slab may be supoprted by any suitable means such, for example, as stone legs 24 at regular intervals around the periphery of the table, which legs are secured together at the bottom for stability by runners 26.

Referring now more particularly to FIGURE 1, it will be noted that the table illustrated is designed so that four sectional negatives can be used to reproduce the total area of a drawing if it extends the maximum length of the top of the table although any desired number of negatives may be used. In order to maintain alignment between the negatives, indicating or aligning markers are used which are located in the runners 16 and 18 on the sides of the table outside the edges of the drawings. Each of these indicating markers, shown generally at 28, consist of a metal bushing member 30 which is set in either the runner 16 or 18 and which bushing has a central opening 32 therein for vertically supporting a tappet type marker 34. Such a marker is shown in detail in FIGURE 4. This tappet 34 has a shaft which is supported in the vertical opening 32 in the bushing 30 and can move vertically in said opening. The head of the tappet 34 also rides in an enlarged opening 36 in the top of the bushing 30. A piece of sponge rubber 38 or other similar resilient material or coil spring may be located in an opening 40 in the stone table below the tappet shaft and the shaft of the tappet presses down upon the resilient means such as 38 and is biased upwardly. This provides a certain amount of vertical movement for the marker 34, the purpose for which will be explained at a later point.

The negatives are glass plates such as 54 which have a coating of light sensitive material 56 on one face. In order that there be perfect contact between the sensitized surface 56 of any negative and the surface of the original drawing provision is made for pulling these two surfaces together tightly by vacuum and in order to do this a vacuum frame 42 is provided which is placed over each glass negative when it is properly located and then vacuum is applied through connections 44 from a vacuum source and openings 46 through the table to a peripheral opening 48 in the frame 42. The frame likewise is provided with sealing gaskets 50 around the edge through which the vacuum is applied to seal the same when the vacuum frame is pulled down tightly. An opening 52 is also applied in the inside lower frame edge to suck the air out from that area between the metal drawing the glass negative sheet which rests on top of it.

In practicing this method the original drawing is first laid upon the table in proper position and then a first negative glass sheet 54 which has previously been sensitized by applying a light sensitive coating 56 to its under surface is positioned over one end of the drawing as shown in FIGURE 1. In this position the corners of the glass negative 54 will cover four of the aligning tappet assemblies 28 and will depress each of these tappets 34 a slight amount and be firmly in contact therewith. The purpose of resiliently mounting the tappets is to provide adjustment for variation in the thickness of the metal drawing sheet as well as thickness of the paint layer on the same and it is necessary to have the tappets firmly in contact with the negatives for proper alignment. The vacuum frame 42 is next brought into position over the glass negative 54 and vacuum applied to bring the drawing surface and the negative sensitive surface into complete contact. An exposing light source above the table is then energized for a proper length of time to expose the light sensitive means. At the termination of the time period vacuum is removed and the frame taken away. The first negative section has now been exposed and is also removed. A second sensitized glass negative 58 is now put in place over the next area of the original drawing which it is desired to photograph. The same procedure is followed. However, this time the corners of the sensitized glass negative 58 will be over the two aligning tappets 28 to the second from the left in FIG. 1 used previously but in addition the next two tappets, those in the middle of the table. The vacuum frame will be replaced, vacuum applied and the exposure made. This is repeated until all four negatives have been exposed at which time four sectional negatives having overlapping portions have now been obtained representing together the complete metal drawing.

After these negatives have been developed and are ready for printing a metal plate of the same dimensions as the original drawing is painted with white paint. It is next coated with light sensitive material and placed on the table in the same position as the original drawing. It is to be mentioned that each of the negatives 54, 58, 60 and 62 have a small alignment diagram in each corner which has been obtained photographically from the configuration 64 on top of each of the tappets 34. The specific design is not important as long as it includes a series of contrasting light and dark spaces. After the sensitized positive print is placed in position on the table the first negative 54 is placed in the lefthand position with each of its corner diagrams in exact alignment with the like diagram on top of the tappet in each of the four corners. The vacuum frame is now again brought over the negative and vacuum applied to suck the frame down and to maintain the negative in complete contact with the surface of the positive print. Opaque means is placed over the remainder of the sensitized surface of the positive. A light source is then energized to expose, by ordinary contact printing, that portion of the positive print under the first negative section, and since shielding means covers the remainder of the positive print that is unaffected by the light. After a sufficient amount of exposure time the vacuum frame is removed and negative 54 taken from the first position. Negative 58 is next placed in the proper position with its four alignment areas directly over the diagrams of the four tappets in the corners on the table edge, defining the next rectangular area, the vacuum frame replaced and the second section exposed, the other three areas being covered to shield them from the light. Negatives 60 and 62 are next sequentially placed in proper position aligned with the tappets 34 in the corners of their areas and exposed. At the completion the positive print is taken from the table and developed and is an accurate reproduction of the original on dimensionally stable material.

It is to be noted that the means for aligning the various sectional negatives is all located outside of the area occupied by the original drawing or by the print and is permanently affixed to the table and a part thereof. Alternatively two tables may be used, one upon which the original drawing may be placed for obtaining negatives and a second for printing the positive print. In that case the two tables must be identical and the position of the tappets on the second table must be identical with those on the first table. The use of two tables would help to speed up the production but they would in no manner change the method utilized. Various configurations can be utilized on top of the tappets for alignment purposes as long as there are different areas of contrasting colors such as black and white.

By the use of my method and apparatus accurate scalable reproductions of large metal drawings on dimensionally stable material are obtained.

What I claim is:

1. In a method of reproducing large drawings, the steps of forming a support for said drawing having a plurality of spaced resiliently mounted alignment markers along the two major edges of the drawing, placing a first sensitized plate transversely across one end of the drawing and covering the first four alignment markers, exposing said plate to obtain a negative of a first section of the drawing and the four alignment designs, removing the first plate and developing the same, placing a second sensitized plate transversely across the drawing but positioning it further toward the middle of the drawing by one transverse set of alignment markers, exposing said second sensitized plate and removing and developing the same, positioning as many more sensitive plates as are necessary to cover the remainder of the drawing moving one set of alignment markers along the transverse axis each time a new sensitized plate is applied until the whole drawing has been covered and sectional negatives having alignment markers have been made, substituting a sensitized sheet of dimensionally stable material of the same size as the original drawing for the same, placing the first negative made from the first sensitized plate over the first four alignment markers on one end of the sensitized sheet with the developed alignment designs on the negative in exact registration with those on the first four alignment markers, covering with opaque material the remainder of the sensitized sheet, exposing the first negative plate for the proper length of time, removing the first negative plate placing the second negative plate one set of alignment markers to one side of the location of the first and again aligning the developed designs on the corners of the second negative plate with the alignment markers on the supporting means, covering with opaque means the remainder of the sensitized sheet so that it will not be affected by light, exposing the second negative plate and proceeding in the same manner until all of the negative plates have been printed on the sensitized sheet and lastly removing the sensitized sheet and developing the same as a positive print.

2. In a photographic process wherein a large metal drawing on dimensionally stable opaque material is accurately reproduced full size on a dimensionally stable plate by the use of smaller sectional negatives representative of portions of the original drawing, the steps of providing a common supporting means for the original drawing and the positive print of the same size, providing rows of alignment markers on the supporting means along opposite longitudinal edges and beyond the edge of both the original drawing when it is supported thereon and also beyond the edge of the positive print when it is supported, selecting sensitized negative sections that extend across a portion of the original drawing and cover a plurality of markers on each side, placing the original drawing on the supporting means, placing sensitive negative sections sequentially over adjacent portions of the original drawing and markers on each side so that the areas overlap and exposing each in order until the whole surface of the drawing has been photographed on the negative sections, removing the original drawing from the supporting means, developing all the negative sections, placing a sensitized positive plate on the supporting means in the position previously occupied by the original drawing, placing a first negative section in its proper order in sequence over a portion of the sensitized positive plate with the reproduction of the markers along opposite edges aligned accurately with the markers on the supporting means from which the negative marker images were made, covering the remainder of the sensitized positive plate with opaque material and exposing the first negative section, removing said first negative section and a portion of the opaque covering material adjacent thereto, placing a second negative section over the adjacent portion of the sensitized positive plate and aligning the images of the markers along the edges of the negative section with the markers on the supporting means from which the images were made, covering all remaining portions of the sensitized positive plate with opaque material, exposing said second negative section, repeating the steps with each of the additional negative sections until the complete positive plate is exposed, then developing the positive plate to obtain a full size drawing reproduction.

References Cited in the file of this patent

UNITED STATES PATENTS

| | | |
|---|---|---|
| 1,808,352 | Hollen | June 2, 1931 |
| 1,958,727 | Sullivan | May 15, 1934 |
| 2,000,390 | Huebner | May 7, 1935 |
| 2,361,183 | Eddy | Oct. 24, 1944 |
| 2,418,754 | Brunet | Apr. 8, 1947 |
| 2,711,031 | Kessler | June 21, 1955 |
| 2,713,294 | Padgett | July 19, 1955 |
| 2,825,976 | Radencic | Mar. 11, 1958 |